US009234656B2

(12) United States Patent
Blondin et al.

(10) Patent No.: US 9,234,656 B2
(45) Date of Patent: Jan. 12, 2016

(54) HEATERS FOR ELECTROMAGNETIC WAVE TRANSMITTING SURFACES IN COLD-TEMPERATURE ENVIRONMENTS

(71) Applicants: Sean Blondin, Orange, CT (US); Thomas Reed, Houston, TX (US)

(72) Inventors: Sean Blondin, Orange, CT (US); Thomas Reed, Houston, TX (US)

(73) Assignee: Coopert Technologies Company, Houston, TX (US)

( * ) Notice: Subject to any disclaimer, the term of this patent is extended or adjusted under 35 U.S.C. 154(b) by 335 days.

(21) Appl. No.: 13/842,340

(22) Filed: Mar. 15, 2013

(65) Prior Publication Data
US 2014/0268647 A1 Sep. 18, 2014

(51) Int. Cl.
| F21V 29/00 | (2015.01) |
| G02B 27/00 | (2006.01) |
| B64F 1/20 | (2006.01) |
| F21S 8/02 | (2006.01) |
| F21V 29/90 | (2015.01) |
| F21W 111/06 | (2006.01) |

(52) U.S. Cl.
CPC .............. *F21V 29/008* (2013.01); *B64F 1/205* (2013.01); *F21S 8/022* (2013.01); *F21V 29/90* (2015.01); *G02B 27/0006* (2013.01); *F21W 2111/06* (2013.01)

(58) Field of Classification Search
CPC ....... F21V 29/008; F21V 29/90; B64F 1/205; F21S 8/022; G02B 27/0006
See application file for complete search history.

(56) References Cited

U.S. PATENT DOCUMENTS

| 6,137,446 | A | 10/2000 | Jones |
| 6,563,086 | B1 | 5/2003 | Meirndorf et al. |
| 6,866,394 | B1 | 3/2005 | Hutchins et al. |
| 7,192,155 | B2 | 3/2007 | Morrow et al. |
| 7,262,388 | B2 | 8/2007 | Moreth et al. |
| 7,410,267 | B2 | 8/2008 | Mochizuki |
| 7,553,053 | B2 | 6/2009 | Mochizuki |
| 7,914,162 | B1 | 3/2011 | Huang |
| 7,997,767 | B2 | 8/2011 | Chu et al. |
| 8,217,306 | B2 | 7/2012 | Inoue et al. |
| 2006/0011598 | A1 | 1/2006 | Yasuda |
| 2010/0080542 | A1 | 4/2010 | Tartock |
| 2012/0201031 | A1 | 8/2012 | Marley |

FOREIGN PATENT DOCUMENTS

| CN | 102917951 | 2/2013 |
| JP | 4108096 | 4/1992 |
| RU | 2206082 | 6/2003 |
| RU | 2465687 | 10/2012 |
| WO | 9409684 | 5/1994 |
| WO | 2011/074229 | 6/2011 |

OTHER PUBLICATIONS

Schedrina, O., International Search Report and Written Opinion of the International Searching Authority for PCT/US2014/025858, Jul. 4, 2014, pp. 1-7.

*Primary Examiner* — Joseph L Williams
(74) *Attorney, Agent, or Firm* — King & Spalding LLP

(57) ABSTRACT

An electromagnetic wave transmitting device having a body and a heating assembly. The body can include a transmitting end and a receiving end. The heating assembly can be disposed on at least a portion of the transmitting end of the body. The heating assembly can include an electrically resistive element having an electrical connector. The heating assembly can also include a first electrically non-conductive film disposed over the electrically resistive element.

20 Claims, 4 Drawing Sheets

HEATERS FOR ELECTROMAGNETIC WAVE TRANSMITTING SURFACES IN COLD-TEMPERATURE ENVIRONMENTS

TECHNICAL FIELD

Embodiments described herein relate generally to a device that uses an electromagnetic wave transmitting surface in cold-temperature environments.

BACKGROUND

Light fixtures (and other devices that transmit electromagnetic waves) that are located in harsh environments can experience one or more problems that prevent such light fixtures from operating properly. For example, in cold-temperature environments, whether indoors or outdoors, frost and other forms of ice can form on the lens of a light fixture. In such a case, the light emitted from a light source inside the light fixture can be altered, suppressed, or otherwise impaired, making the light fixture ineffective for its intended purpose.

SUMMARY

In general, in one aspect, the disclosure relates to an electromagnetic wave transmitting device. The electromagnetic wave transmitting device can include a body having a transmitting end and a receiving end. The electromagnetic wave transmitting device can also include a heating assembly disposed on at least a portion of the transmitting end of the body. The heating assembly can include an electrically resistive element having an electrical connector. The heating assembly can also include a first electrically non-conductive film disposed over the electrically resistive element.

In another aspect, the disclosure can generally relate to an electromagnetic wave emitting fixture located in a cold-temperature environment. The electromagnetic wave emitting fixture can include a frame having at least one wall forming a cavity and a optical housing mechanically coupled to the at least one wall, where the optical housing has an aperture that traverses therethrough. The electromagnetic wave emitting fixture can also include a light source disposed within the cavity proximate to the aperture. The electromagnetic wave emitting fixture can further include a power supply electrically coupled to the light source. The electromagnetic wave emitting fixture can also include an electromagnetic wave transmitting device disposed in the aperture. The electromagnetic wave transmitting device can include a body having a transmitting end and a receiving end. The electromagnetic wave transmitting device can also include a heating assembly disposed on at least a portion of the transmitting end of the body. The heating assembly can include an electrically resistive element having an electrical connector electrically coupled to the power supply. The heating assembly can also include a first electrically non-conductive film disposed over the electrically resistive element.

In yet another aspect, the disclosure can generally relate to an airport runway light fixture. The airport runway light fixture can include a frame having at least one wall forming a cavity and a optical housing mechanically coupled to the at least one wall, where the optical housing has an aperture that traverses therethrough. The airport runway light fixture can also include a light source disposed within the cavity proximate to the aperture, and a power supply electrically coupled to the light source. The airport runway light fixture can further include an electromagnetic wave transmitting device disposed in the aperture. The electromagnetic wave transmitting device can include a body having a transmitting end and a receiving end. The electromagnetic wave transmitting device can also include a heating assembly disposed on at least a portion of the transmitting end of the body. The heating assembly can include an electrically resistive element having an electrical connector electrically coupled to the power supply. The heating assembly can also include an electrically non-conductive film disposed over the electrically resistive element. The light source can generate a light output that complies with at least one regulation in the airline industry.

These and other aspects, objects, features, and embodiments will be apparent from the following description and the appended claims.

BRIEF DESCRIPTION OF THE DRAWINGS

The drawings illustrate only example embodiments of heaters for electromagnetic wave transmitting surfaces of electromagnetic wave emitting fixtures located in cold-temperature environments and are therefore not to be considered limiting of its scope, as heaters for electromagnetic wave transmitting surfaces in cold-temperature environments may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

Figure 1:
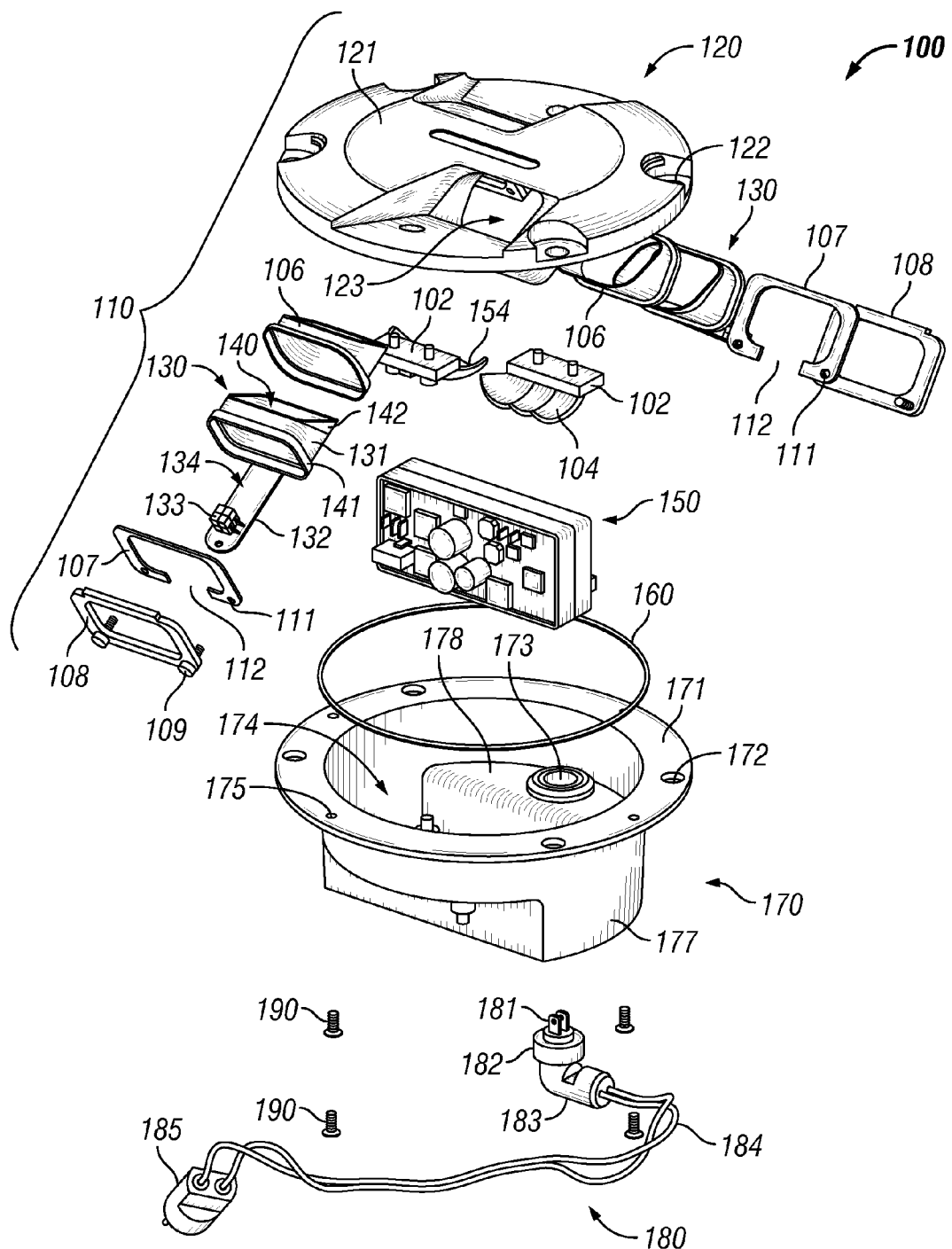
FIG. 1 shows an exploded perspective view of a light fixture in accordance with certain example embodiments.

The example embodiments discussed herein are directed to systems, methods, and devices for heaters for electromagnetic wave transmitting surfaces of electromagnetic wave emitting fixtures located in cold-temperature environments. As a specific example, example embodiments may be directed to using example heating assemblies with lighting fixtures that are located in environments, indoors or outdoors, where temperatures can be near and/or below freezing. In such a case, condensation (e.g., ice) and/or precipitation (e.g., snow) that builds on the electromagnetic wave transmitting device (e.g., lens, prism) of the light fixture can freeze, inhibiting and/or impairing the light output of the light source inside the light fixture. In some instances, well-known features have not been described in detail to avoid unnecessarily complicating the description. As used herein, terms such as "end," "top," "bottom," and "side" are merely used for descriptive purposes and are not intended to imply a certain orientation unless expressed otherwise.

Example embodiments described herein can also be used with other electromagnetic wave emitting fixtures (e.g., cameras, wave guides) that have an electromagnetic wave transmitting device (sometimes referred to as optical device herein) that is subject to condensation and/or precipitation in cold-temperature environments. In addition, or in the alternative, example embodiments described herein can be used in one or more of a number of industries, including but not limited to transportation (e.g., airports, railroads), energy (e.g., oil and gas exploration and production), chemicals, pipelines, and shipping. An electromagnetic wave transmitting device can be used to transmit one or more of a number of wave types, including but not limited to visible, ultraviolet, and infrared.

Example heating assemblies described herein apply resistive heat directly to the body of an electromagnetic wave transmitting device rather than to some other area (e.g., the optical housing) of the lighting fixture. Thus, certain example embodiments provide a number of benefits. Examples of such benefits include, but are not limited to, higher performance of the light fixture, improved reliability of the light fixture, more efficient use of energy, and more effective removal and/or reduction in frost and related issues caused by cold-temperature environments. Because of the increased efficiency of example heating assemblies, a primary light emitting surface of a light fixture can remain defrosted at temperatures below freezing. For example, example embodiments can function in a cold-temperature environment that is constantly at or below −40° C.

Example embodiments described herein can be directed to one or more of a number of different types of light source, including but not limited to light-emitting diode (LED) light sources, fluorescent light sources, organic LED light sources, incandescent light sources, and halogen light sources. Therefore, example embodiments of light-emitting surface heaters for light fixtures located in cold-temperature environments described herein should not be considered limited to particular type of light source.

In certain example embodiments, light-emitting surface heaters for light fixtures located in cold-temperature environments are directed to airport light fixtures. As used herein an airport light fixture can be used on any part of an airport system, including but not limited to a runway, a jetway, and a taxiway. Such airport light fixtures can be subject to one or more standards and/or regulations. For example, airport light fixtures in the United States can be subject to standards established and maintained by the Federal Aviation Administration (FAA). Another example is Technical Specification 61827 established and maintained by the International Electrotechnical Commission (IEC). Yet another example is Engineering Brief No. 67D published by the FAA. Still another example is Advisory Circular 150/5345-46D published by the FAA. Airport light fixtures using example embodiments described herein allow such airport light fixtures to continue to meet such standards and/or regulations. Similarly, example embodiments used on light fixtures subject to other standards and/or regulations, whether in the airport industry or in another industry, allow such light fixtures to continue to meet such standards and/or regulations.

A user may be any person that interacts with a light fixture using example embodiments described herein. Specifically, a user may install, maintain, operate, and/or interface with a light fixture using example heating assemblies. Examples of a user may include, but are not limited to, an engineer, an electrician, an instrumentation and controls technician, a mechanic, an operator, a consultant, a contractor, and a manufacturer's representative.

Example embodiments of example heating assemblies for light fixtures located in cold-temperature environments will be described more fully hereinafter with reference to the accompanying drawings, in which example heating assemblies for light fixtures located in cold-temperature environments are shown. Heating assemblies may, however, be embodied in many different forms and should not be construed as limited to the example embodiments set forth herein. Rather, these example embodiments are provided so that this disclosure will be thorough and complete, and will fully convey the scope of heating assemblies for light fixtures located in cold-temperature environments to those or ordinary skill in the art. Like, but not necessarily the same, elements (also sometimes called components) in the various figures are denoted by like reference numerals for consistency.

Figure 2:
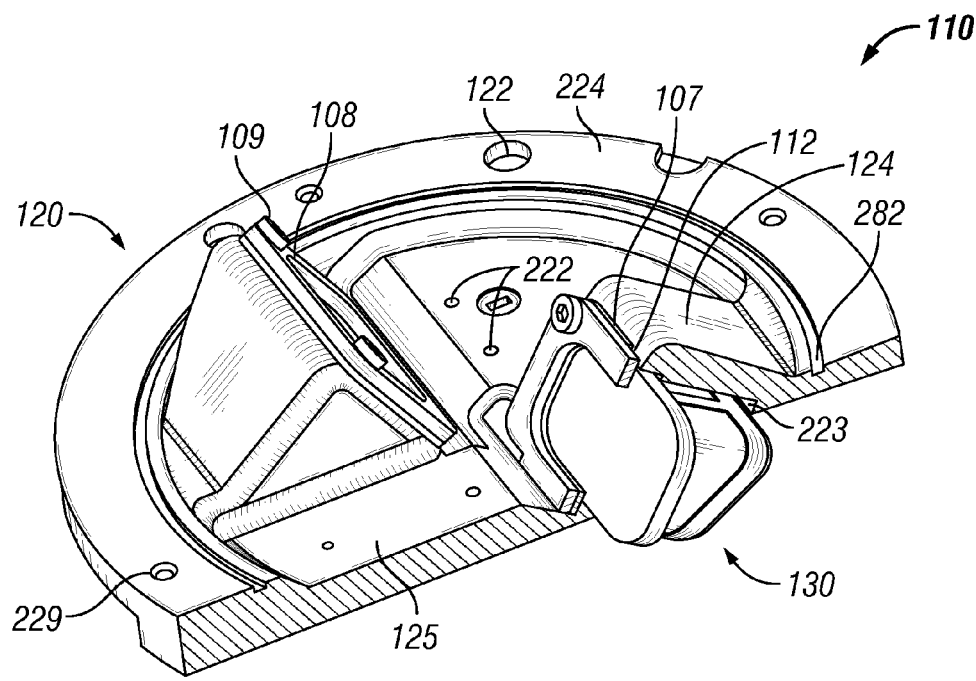
FIG. 2 shows a perspective view of a optical housing assembly of the light fixture of FIG. 1 in accordance with certain example embodiments.

FIG. 1 shows an exploded perspective view of a light fixture 100 with an example heating assembly 134 in accordance with certain example embodiments. FIG. 2 shows a perspective view of the optical housing assembly 110 shown in FIG. 1. In one or more example embodiments, one or more of the components shown in FIGS. 1 and 2 may be omitted, repeated, and/or substituted. Accordingly, example embodiments of a light fixture should not be considered limited to the specific arrangements of components shown in FIGS. 1 and 2.

Referring now to FIG. 1, the light fixture 100 is an example of an airport runway and/or taxiway light fixture. The light fixture 100 of FIG. 1 includes a frame, a light source 104, a power supply 150, and an electromagnetic wave transmitting device 130. The frame can include a cover 170 and optical housing 120. The electromagnetic wave transmitting device 130 can include a body 140 (e.g., a lens, a prism, a diffuser) and the example heating assembly 134. In certain example embodiments, the combination of the optical housing 120, the electromagnetic wave transmitting devices 130, and the associated components that mechanically couple the electromagnetic wave transmitting devices 130 to the optical housing 120 are called the optical housing assembly 110.

The cover 170 of the frame can have a bottom (hidden from view) and at least one wall 177 that forms a cavity 174. Inside of the cavity 174 can be positioned one or more light sources 104, the power supply 150, and (at least to some extent) one or more electromagnetic wave transmitting devices 130. The cover 170 can include one or more features (e.g., ledges, apertures) that allow the various components disposed in the cavity 174 to fit and maintain electrical, mechanical, and/or thermal coupling with each other.

For example, an aperture 173 through the bottom of a ledge 178 of the cover 170 can allow a power cord 180 (and, more specifically, a connector 181 at one end of the power cord 180) to extend into the cavity 174 and electrically couple to a complementary connector of the power supply 150. In such a case, the power cord 180 can also include other components (e.g., collar 182, elbow fitting 183) positioned proximate to the connector 181 that allow for efficient coupling of the power cord 180 to the power supply 150. As another example, a number of large apertures 172 and small apertures 175 that traverse a collar 171 along the top of the cover 170 can allow fastening devices (e.g., bolts, such as fastening devices 190) to fully or partially traverse corresponding large apertures 122 and small apertures 229 (as shown in FIG. 2 below), thus allowing the cover 170 to mechanically couple to the optical housing 120.

The cover 170 can be made from a single piece (as from a mold or cast), or the cover 170 can be made of multiple pieces that are mechanically coupled to each other using one or more of a number of coupling methods. Such coupling methods can include, but are not limited to, welding, compression fittings, clamps, and fastening devices. The cover 170 can have a single wall 177 (as to form a circle, oval, or some other shape without corners when viewed cross-sectionally) or multiple walls 177. As shown in FIG. 1, the cover 170 has a single wall 177 that substantially forms a circle when viewed cross-sectionally.

The optical housing 120 of the frame is shown in a top perspective view in FIG. 1 and a bottom perspective view in FIG. 2. The optical housing 120 protects the components disposed within the cavity 174, and can also secure the light sources 104 and the electromagnetic wave transmitting devices 130. Referring to FIGS. 1 and 2, the optical housing 120 can include a number of features. For example, as discussed above, the optical housing 120 can have large apertures 122 and small apertures 229 disposed toward the outer perimeter of the optical housing 120 to allow the optical housing 120 to mechanically couple to the cover 170.

As another example, the bottom surface 125 of the optical housing 120 can include a channel 282 into which a sealing member (e.g., sealing member 160) can be disposed. The channel 282 can be disposed on the bottom surface 125 of the optical housing 120 proximate to the mating collar 224 of the optical housing 120, where the mating collar 224 mates with the collar 171 of the cover 170 when the optical housing 120 mechanically couples to the cover 170. The sealing member 160 (e.g., an o-ring, a gasket) can be used to protect the components disposed inside the cavity 174 from one or more of a number of elements when the optical housing 120 is mechanically coupled to the cover 170. Such elements can include, but are not limited to, moisture, dust, and chemicals.

As yet another example, the optical housing 120 can have one or more apertures 123 traverse therethrough. Such apertures 123 can be used to secure a portion of a electromagnetic wave transmitting device 130. For example, as shown in FIG. 2, the optical housing 120 can have two apertures 123, one for each of two electromagnetic wave transmitting devices 130. The transmitting end 142 of the body 140 of each electromagnetic wave transmitting device 130 can be disposed within a sealing member 106 and abut against a protruding feature 223 that extends inward along some or all of the aperture at the top surface 121 of the optical housing 120. The sealing member 106 can help ensure that liquids and other foreign materials do not enter into the cavity 174.

Example embodiments of heating assemblies 134 described herein allow for minimal or no alteration of features of an existing fixture or device, which allows for retrofitting applications. For example, the sealing member 106 shown in FIG. 1 can be used with or without the heating assembly 134 disposed over the body 140 of the electromagnetic wave transmitting device 130. The low profile of the heating assembly 134 provides for a number of retrofitting applications with minimal or no alterations or costs to modify an existing fixture or device.

To hold the electromagnetic wave transmitting device 130 in place along the receiving end 141 of the body 140 of the electromagnetic wave transmitting device 130, a retaining feature 108 can abut against at least a portion of the receiving end 141 of the body 140 of the electromagnetic wave transmitting device 130. The retaining tfeature 108 can also be mechanically coupled to a sleeve 124 on the bottom surface 125 of the optical housing 120. The sleeve 124 can include one or more fastening features (e.g., apertures, slots, notches) that can receive a complementary fastening feature of the retaining feature 108. For example, a fastening device 109 (e.g., a bolt) traverses an aperture in the retaining feature 108 and partially traverses an aperture in the sleeve 124 to mechanically couple the retaining feature 108 to the sleeve 124, thus securing the electromagnetic wave transmitting device 130 within the aperture 123 of the optical housing 120.

In certain example embodiments, a sealing member 107 can be disposed between the retaining feature 108 and the sleeve 124. The sealing member 107 can have one or more fastening features (e.g., aperture 111) that coordinate with the one or more fastening features of the retaining feature 108 and/or the sleeve 124 to allow the retaining feature 108 and the sleeve 124 to be mechanically coupled to each other. In certain example embodiments, the sealing member 107 has a gap 112, which can be used to allow the connective portion 132 of the heating assembly 134 to receive power, as discussed below.

The bottom surface 125 of the optical housing 120 can have other features to accommodate other components disposed within the cavity 174. For example, apertures 222 can at least partially traverse the bottom surface 125 of the optical housing 120. The apertures 222 can receive fastening devices (e.g., screws) that protrude from a mounting platform 102 to allow the mounting platform 102 to be mechanically coupled to the bottom surface 125 of the optical housing 120. In such a case, one or more light sources 104 can mechanically couple to the mounting platform 102. In certain example embodiments, the mounting platform 102 also includes an electrical connection 154 that allows the light sources 104 to receive power from the power source 150. Thus, the light sources 104 can also be electrically coupled to the mounting platform 102. More details of the power supply 150 are described below with respect to FIG. 6.

As discussed above, the example electromagnetic wave transmitting device 130 can include a body 140 and a heating assembly 134. The body 140, as described above, can have a transmitting end 142 and a receiving end 141. The body 140 can have any of a number of shapes and/or sizes that can vary based on one or more of a number of factors, including but not limited to the space into which the body 140 is disposed, the desired optical effect of the light source 104, and the type of light source 104. The body 140 (or portions thereof) can be made from one or more of a number of materials, including but not limited to glass and plastic.

Figure 3:
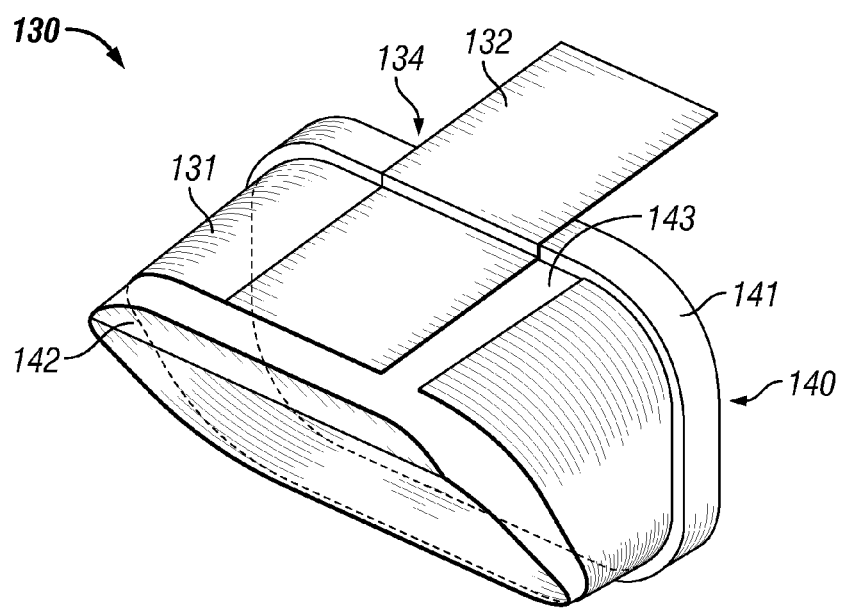
FIG. 3 shows a perspective view of an example optical device of the light fixture of FIGS. 1 and 2 in accordance with certain example embodiments.
Figure 4:
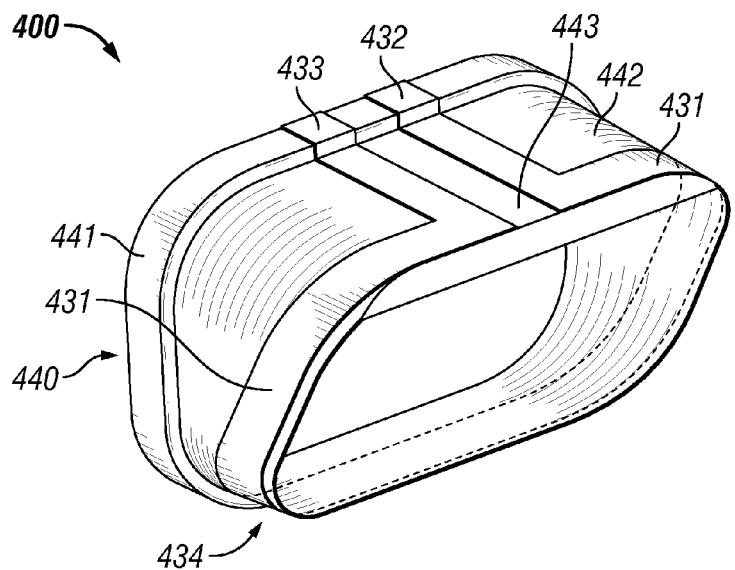
FIG. 4 shows an optical device with an alternative example heating assembly in accordance with certain example embodiments.

In certain example embodiments, the heating assembly 134 includes a connective portion 132 and a main portion 131. The connective portion 132 can be electrically coupled to the main portion 131. Likewise, the connective portion 132 can be electrically coupled to the power supply 150. The connective portion 132 can be electrically coupled to the power supply 150 using an electrical connector 133 disposed at a distal end of the connective portion 132, as shown in FIG. 1. The electrical connector 133 can be directly electrically coupled to the power supply 150 or indirectly electrically coupled to the power supply 150 using a wired (e.g., a cable) or wireless connection. Alternatively, the electrical connector 133 can be omitted, and wires can be electrically coupled (e.g., soldered) to the connective portion 132 from the power supply 150. The electrical connector 133 can have any configuration (e.g., 4-pin) that allows power from the power supply 150 to flow through the heating assembly 134. The connective portion 132 and the main portion 131 can be made of one or more of a number of electrically conductive, electrically semi-conductive, and/or dielectric components and/or materials. FIGS. 3 and 4 show further details of example electromagnetic wave transmitting devices. In addition, FIGS. 5A and 5B below show further details as to the heating assembly 134.

The example light fixture 100 shown in FIGS. 1 and 2 is a type of airport runway light fixture. In this case, the cover 170 of the frame can be positioned below ground (buried), and the optical housing 120 of the frame can be substantially flush with a ground surface. Thus, the top surface 121 of the optical housing 120, as well as the orientation of the electromagnetic wave transmitting devices 130 within the optical housing assembly 110, are positioned for such a mounting orientation. However, example heating assemblies 134 can be used with airport light fixtures that are positioned entirely above ground, and so example embodiments are not limited to the example shown in FIGS. 1 and 2.

The optical housing 120 and the cover 170 of the frame of the light fixture 100 can be made of one or more of a number of materials, including but not limited to stainless steel, galvanized steel, and aluminum. The optical housing 120 and/or the cover 170 can be electrically conductive or electrically non-conductive.

FIG. 3 shows a perspective view of the example electromagnetic wave transmitting device 130 of the light fixture of FIGS. 1 and 2 in accordance with certain example embodiments. In one or more example embodiments, one or more of the components shown in FIG. 3 may be omitted, repeated, and/or substituted. Accordingly, example embodiments of an electromagnetic wave transmitting device should not be considered limited to the specific arrangements of components shown in FIG. 3.

Referring to FIGS. 1-3, the body 140 of the electromagnetic wave transmitting device 130 has a receiving end 141 that is antiparallel to the transmitting end 142. The receiving end 141 can be the portion of the body 140 that is positioned proximate to the light sources 104 disposed within the cavity 174 of the frame. The body 140 can be a glass prism, or any other type of electromagnetic wave transmitting device made of any other material. In certain example embodiments, the receiving end 141 can be parallel or substantially parallel to the transmitting end 142. Further, the receiving end 141 and/or the transmitting end 142 can be flat, curved, textured, fractured, and/or have any other feature.

The main portion 131 of the example heating assembly 134 can be disposed on (wrap around) some or all of the transmitting end 142 of the body 140. Similarly, the connective portion 132 of the example heating assembly 134 can be disposed on some or all of the receiving end 141 of the body 140. In this case, the main portion 131 is disposed over substantially the entire length of the transmitting end 142 of the body 140 around most of the perimeter. A gap 143 in the main portion 131 can exist so that a fault condition is averted and so that the main portion 131 provides a sufficient amount of resistive heat. In certain example embodiments, the main portion 131 and/or the connective portion 132 are made of an electrically resistive element or some similar electrically conductive material that can be shaped like the portions of the body 140 on which the connective portion 132 and the main portion 131 are disposed. The electrically resistive element can take one or more of a number of forms, including but not limited to a foil, a wire, a coil, and a bar.

Alternatively, the main portion 131 and/or a portion of the connective portion 132 can coat the body 140. In other words, the main portion 131 and/or a portion of the connective portion 132 can be applied to the body 140 as a liquid and allowed to solidify. In such a case, the main portion 131 and the connective portion 132 can be made of an electrically conductive material having a known resistance in its solidified state.

In certain example embodiments, an electrically non-conductive film (layer) of material is disposed over the main portion 131 (and in come cases, over the connective portion 132) of the heating assembly 134. The electrically non-conductive film can cover at least a portion, if not all, of the heating assembly 134. In some cases, the electrically non-conductive film can also cover portions of the receiving end 141 and/or the transmitting end 142 of the body 140 on which the heating assembly 134 is not disposed. The electrically non-conductive film can be made of one or more of a number of materials that can be shaped according to the shape of the body 140. Such materials can include, but are not limited to, polyamide or some other similar polymer.

In addition, or in the alternative, an electrically non-conductive film can be disposed between some or all of the body 140 and the heating assembly 134. The electrically non-conductive film that is disposed between the body 140 and the heating assembly 134 can be made of the same or different material than the electrically non-conductive film that is disposed over the heating assembly 134. The electrically non-conductive film that is disposed between the body 140 and the heating assembly 134 can be adhered to the body 140 using an adhesive. Such an adhesive can have one or more of a number of properties in addition to being adhesive, including but not limited to being flame-retardant.

The main portion 131 and/or the connective portion 132 of the heating assembly 134 can have a known resistance (e.g., 0.276 Ω). In certain example embodiments, the resistance of the connective portion 132 is relatively minimized relative to the main portion 131 so that relatively little heat is generated by the connective portion 132 compared to the main portion 131. As such, the amount of power delivered to the connector 133 (hidden from view in FIG. 3) can be set so that an appropriate amount of heat can be generated by the heating assembly 134. The connective portion 132 and the main portion 131 of the heating assembly 134 can be made from a single piece or can be multiple pieces that are coupled together while still providing a solid electrical connection therebetween. The thickness of the heating assembly can be substantially uniform and have a fairly low profile (e.g., 0.0085 inches, 0.038 inches).

In certain example embodiments, the current delivered by the power supply 150 is a fixed current, and so the fixed resistance of the heating assembly 134 provides a known quantity of heat to the body 140. Alternatively, the current delivered by the power supply 150 can vary based on, for example, an algorithm within a controller, as described below with respect to FIG. 6. As another alternative, the resistance of the resistive element of the heating assembly 134 can vary using, for example, a switch at the electrical connector 133. In lieu of a current controller, a voltage controller can be used to provide fixed or variable voltage to the heating assembly 134.

In certain example embodiments, the connective portion 132 of the heating assembly 134 extends beyond the receiving end 141 of the body 140. In such a case, the connective portion 132 can extend into the cavity 174 of the frame to make the electrical connection with the power supply 150. As discussed above, the gap 112 in the sealing member 107 can have a width and thickness that corresponds with the width and thickness of the connective portion 132 so that the connective portion 132 can pass between the retaining feature 108 and the sleeve 124 on the bottom surface 125 of the optical housing 120. In such a case, the connective portion 132 can be coated on both sides (at least where the connective portion is proximate to the retaining feature 108 and the sleeve 124) by an electrically non-conductive coating, as described above, to prevent a fault, short circuit, or other similar adverse electrical condition.

FIG. 4 shows an electromagnetic wave transmitting device 400 with an alternative example heating assembly 434 in accordance with certain example embodiments. The body 440 of the electromagnetic wave transmitting device 400 in FIG. 4 is substantially the same as the body 140 of the electromagnetic wave transmitting device 130 in FIG. 3. Similarly, the heating assembly 434 of the electromagnetic wave transmitting device 400 in FIG. 4 is substantially the same as the heating assembly 134 of the electromagnetic wave transmitting device 130 in FIG. 3, with exceptions as discussed below.

The main portion 431 of the heating assembly 434 of FIG. 4 only covers a portion of the transmitting end 442 of the body 440. In this case, only the distal end of the transmitting end 442 of the body 440 is covered by the main portion 431 of the heating assembly 434. Further, while a gap 443 forms to prevent the main portion 431 from covering the entire perimeter of the transmitting end 442 of the body 440, there are two connective portions 432, 433 that each narrow compared to the width of the connective portion 132 of FIG. 3. While hidden from view, one or both connective portions 432, 433 can have one or more elements (e.g., thermistor, electrical connector) disposed on their back side (hidden from view).

Figure 5A:
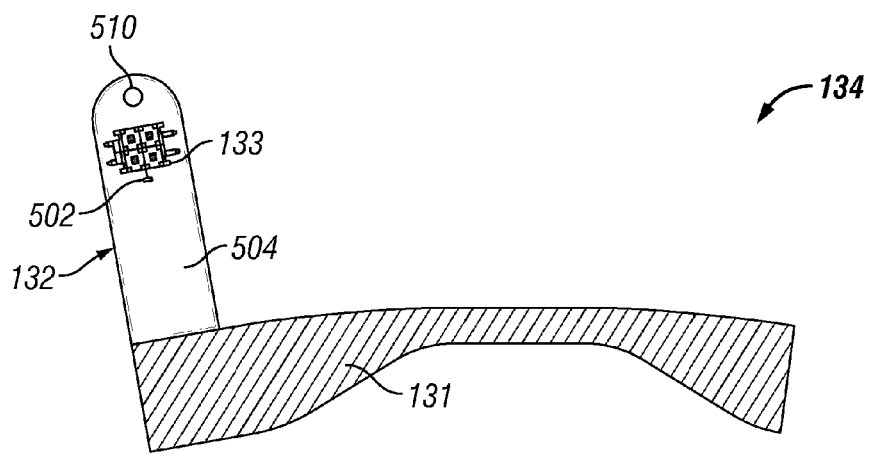
FIGS. 5A and 5B show various views of an example heating assembly in accordance with certain example embodiments.
Figure 5B:
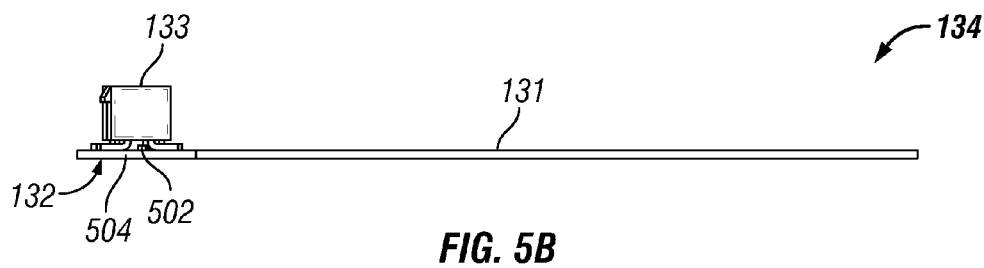

FIGS. 5A and 5A show various views of the example heating assembly 134 of FIGS. 1-3 in accordance with certain example embodiments. Specifically, FIG. 5A shows a front view of the heating assembly 134, and FIG. 5B shows a bottom view of the heating assembly 134. In one or more example embodiments, one or more of the components shown in FIGS. 5A and 5B may be omitted, repeated, and/or substituted. Accordingly, example embodiments of a heating assembly should not be considered limited to the specific arrangements of components shown in FIGS. 5A and 5B.

Referring to FIGS. 1-5B, a number of the features of the heating assembly 134 are described above. In addition to the electrical connector 133, in certain example embodiments, the bottom side of the connective portion 132 of the heating assembly 134 can include one or more of a number of features. For example, as shown in FIGS. 5A and 5B, such features can include a circuit board 504, a thermistor 502, and one or more clearance holes 510. The circuit board 504 can be integrated within some or all of the connective portion 132. In such a case, the circuit board 504 can be fully or partially flexible so that the circuit connections of the circuit board 504 remain in tact if and when the flexible connective portion 132 is moved. The circuit board 504 can be used to channel the power received through the electrical connector 133, provide power to the thermistor 502, communicate readings made by the thermistor 502, and/or perform any other functions for efficient operation of the heating assembly 134.

The thermistor 502 is a generic term used for a sensing device that can measure temperature. The thermistor 502 can measure a temperature of the connective portion 132. In other words, the thermistor 502 can be thermally coupled to the connective portion 132. In addition, or in the alternative, the thermistor 502 can be electrically isolated from the power flowing through the resistive element in the main portion 131, as shown below in FIG. 6. The temperature of the connective portion 132 can be used to control when power is applied or not applied to the heating assembly 134. The role of the thermistor 502 is described below in more detail with respect to FIG. 6. A thermistor 502 can have one or more of a number of features, including but not limited to digital capability, bi-metal, and compact.

The optional clearance hole 510 is a type of coupling feature that allows at least a portion of the connective portion 132 of the heating assembly 134 to mechanically couple to the bottom surface 125 (or some other portion) of the optical housing 120. The clearance hole 510 can be complementary with one or more coupling features of the optical housing 120. For example, a fastening device (e.g., a screw) can traverse the clearance hole 510 as well as at least a portion of an aperture in the bottom surface 125 of the optical housing 120 to mechanically couple the heating assembly 134 to the optical housing 120.

Figure 6:
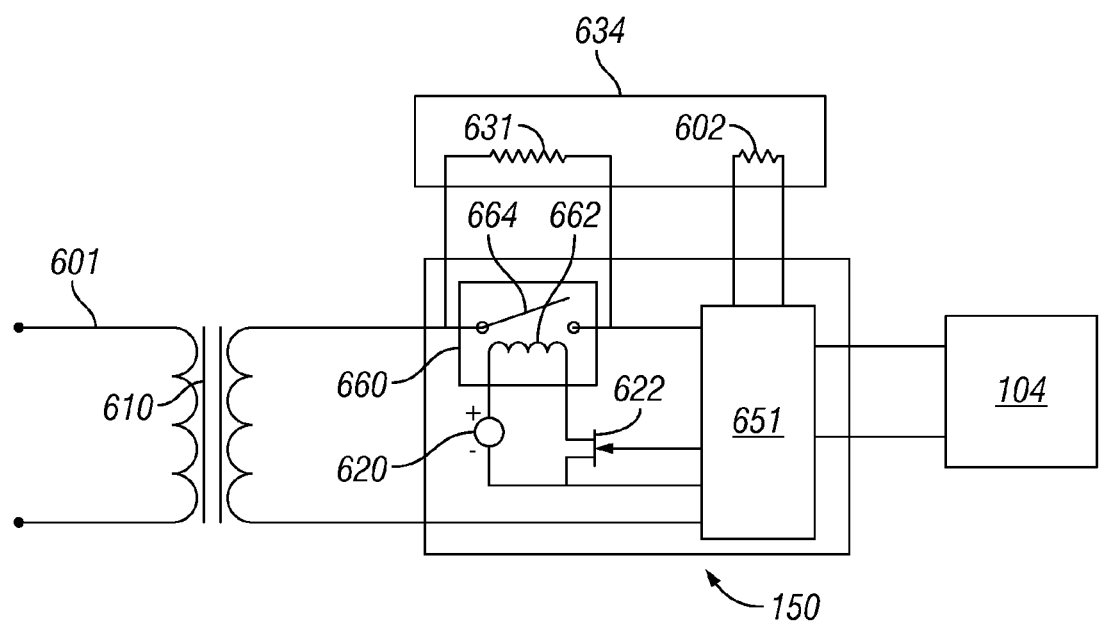
FIG. 6 shows an electrical schematic of a light fixture using an example heating assembly in accordance with certain example embodiments.

FIG. 6 shows an electrical schematic 600 of a light fixture using an example heating assembly 634 in accordance with certain example embodiments. In one or more example embodiments, one or more of the components shown in FIG. 6 may be omitted, repeated, and/or substituted. Accordingly, example embodiments of an electrical schematic for a light fixture using a heating assembly should not be considered limited to the specific arrangements of components shown in FIG. 6.

Referring to FIGS. 1-6, the power supply 150 receives its source of power from a source. In this case, the power starts at a source 601, goes through a charge transfer device 610 (e.g., a transformer), and from there is delivered to the power supply 150. The power supply 150 can include one or more of a number of components. Examples of such components can include, but are not limited to a controller 651, a switch 622, a regulator 620, and a relay 660. The controller 651 can send a control signal through the switch 622 (e.g., a transistor). When the switch is closed, a closed circuit is created between the regulator 620, the coil 662 of the relay 660, and the switch 622. Thus, the coil 662 of the relay 660 becomes energized when the switch 622 is closed.

When the coil 662 of the relay 660 is energized, the state of the contact 664 changes. If the contact 664 is normally closed, then the contact 664 opens when the relay 660 is energized. Conversely, if the contact 664 is normally open, then the contact 664 closes when the relay 660 is energized. When the contact 664 is open, the power delivered to the power supply 150 through the charge transfer device 610 flows to the main portion 631 of the heating assembly 634 through the connective portion. When the contact 664 is closed, the power delivered to the power supply 150 through the charge transfer device 610 flows through the relay closed contact 664.

The controller 651 closes or opens the switch 622 based on the temperature read by the thermistor 602. If the temperature read by the thermistor 602 is too high, the state of the switch 622 is changed so that current flows through the relay contact 664 rather than through the main portion 631 of the heating assembly 634. If the temperature read by the thermistor 602 is too low, the state of the switch 622 is changed so that current flows through the main portion 631 of the heating assembly 634 rather than through the relay contact 664. The controller 651 can also send power to the light source 104 to generate light output.

The controller 651, the relay 660, the switch 622, and/or other portions of the power supply 150 can include one or more of a number of discrete components (e.g., resistor, capacitor, transistor), integrated circuits, software operating on a hardware processor, and/or any other type of components. Operational aspects of the power supply 150 can be adjusted periodically or randomly by a user, a protocol, a software program, and/or some other actor or component.

In one or more example embodiments, heating assemblies described herein apply resistive heat directly to the body of an electromagnetic wave transmitting device rather than to some other area (e.g., the optical housing) of the lighting fixture. Thus, certain example embodiments provide a number of benefits. Examples of such benefits include, but are not limited to, higher performance of the light fixture, improved reliability of the light fixture, more efficient use of energy, and more effective removal and/or reduction in frost and related issues caused by cold-temperature environments.

Further, example embodiments allow for retrofitting of existing electromagnetic wave transmitting fixtures and devices without the need to modify (or with only minimal modification of) such existing fixture or device. Specifically, the low profile of the example heating assemblies allow for easy and cost-effective retrofitting to provide a more reliable solution to removing condensation and accumulation of snow/ice from an electromagnetic wave transmitting surfaces of an electromagnetic wave emitting fixture.

Accordingly, many modifications and other embodiments set forth herein will come to mind to one skilled in the art to which heaters for electromagnetic wave transmitting surfaces of electromagnetic wave transmitting devices located in cold-temperature environments pertain having the benefit of the teachings presented in the foregoing descriptions and the associated drawings. Therefore, it is to be understood that heaters for electromagnetic wave transmitting surfaces of electromagnetic wave transmitting devices located in cold-temperature environments are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. An electromagnetic wave transmitting device, comprising:
    a body comprising a transmitting end and a receiving end; and
    a heating assembly disposed on at least outer surface of the body, wherein the heating assembly comprises:
        an electrically resistive element comprising an electrical connector,
    wherein the heating assembly is configured to prevent condensation and precipitation from accumulating on the body, and
    wherein the heating assembly is positioned relative to the body to allow light emitted by a light source to be received by the receiving end of the body and transmitted out the transmitting end of the body.

2. The electromagnetic wave transmitting device of claim 1, wherein the body comprises glass.

3. The electromagnetic wave transmitting device of claim 2, wherein the body is a prism.

4. The electromagnetic wave transmitting device of claim 1, wherein the heating assembly further comprises:
    a first electrically non-conductive film disposed over the electrically resistive element; and
    a second electrically non-conductive film disposed between the electrically resistive element and the body.

5. The electromagnetic wave transmitting device of claim 4, wherein the second electrically non-conductive film is adhered to the body using an adhesive.

6. The electromagnetic wave transmitting device of claim 1, wherein the electrically resistive element further comprises a main portion and a connective portion, wherein the electrical connector is disposed on the connective portion, and wherein the main portion is disposed on the body.

7. The electromagnetic wave transmitting device of claim 6, wherein the heating assembly further comprises:
    a thermistor disposed on and thermally coupled to the connective portion of the electrically resistive element.

8. The electromagnetic wave transmitting device of claim 7, wherein the heating assembly further comprises:
    a circuit board electrically coupled to and disposed within the connective portion of the electrically resistive element, wherein the circuit board is further electrically coupled to the thermistor.

9. The electromagnetic wave transmitting device of claim 1, wherein the connector is electrically coupled to a cable, wherein the cable is also electrically coupled to a power supply within a light fixture located in a cold-temperature environment.

10. The electromagnetic wave transmitting device of claim 1, wherein the heating assembly directly contacts the at least one outer surface of the body.

11. An electromagnetic wave emitting fixture located in a condensing or precipitating environment, the electromagnetic wave emitting fixture comprising:
    a frame comprising at least one wall forming a cavity and an optical housing mechanically coupled to the at least one wall, wherein the optical housing comprises an aperture that traverses therethrough;
    a light source disposed within the cavity proximate to the aperture;
    a power supply electrically coupled to the light source; and
    an electromagnetic wave transmitting device disposed in the aperture, wherein the electromagnetic wave transmitting device comprises:
        a body comprising a transmitting end and a receiving end; and
        a heating assembly disposed on at least one outer surface of the body, wherein the heating assembly comprises:
            an electrically resistive element comprising an electrical connector electrically coupled to the power supply,
    wherein the heating assembly prevents condensation and precipitation from accumulating on the body of the electromagnetic wave transmitting device, and
    wherein the heating assembly is positioned relative to the body of the electromagnetic wave transmitting device to allow light emitted by the light source to be received by the receiving end of the body and transmitted out the transmitting end of the body.

12. The electromagnetic wave emitting fixture of claim 11, wherein the electrically resistive element further comprises a main portion and a connective portion, wherein the electrical connector is disposed on the connective portion, and wherein the main portion is disposed on the body.

13. The electromagnetic wave emitting fixture of claim 12, further comprising:
    a cable having a first end and a second end, wherein the first end is electrically coupled to the power supply, and wherein the second end is electrically coupled to the electrical connector.

14. The electromagnetic wave emitting fixture of claim 12, wherein the power supply comprises a controller, wherein the controller is electrically coupled to the thermistor, and wherein the controller determines when power is delivered from the power supply to the electrically resistive element.

15. The electromagnetic wave emitting fixture of claim 12, further comprising:

a retaining member mechanically coupled to an inner surface of the optical housing proximate to the aperture,
wherein the connective portion of the electrically resistive element passes between the retaining member and the optical housing, and
wherein the retaining member secures the electromagnetic wave transmitting device within the aperture.

16. The electromagnetic wave emitting fixture of claim 11, wherein the electrically resistive element is disposed on most of an outer perimeter of at least a distal end of the body of the electromagnetic wave transmitting device.

17. The electromagnetic wave emitting fixture of claim 11, wherein the electrically resistive element is applied to the electromagnetic wave transmitting device as a coating comprising a resistance.

18. The electromagnetic wave emitting fixture of claim 11, further comprising:
a sealing member disposed over the heating assembly on at least a portion of the transmitting end of the body of the electromagnetic wave transmitting device and within at least a portion of the aperture in the optical housing, wherein the sealing member prevents elements outside the frame from entering the cavity.

19. An airport runway light fixture, comprising:
a frame comprising at least one wall forming a cavity and an optical housing mechanically coupled to the at least one wall, wherein the optical housing comprises an aperture that traverses therethrough;
a light source disposed within the cavity proximate to the aperture;
a power supply electrically coupled to the light source; and
an electromagnetic wave transmitting device disposed in the aperture, wherein the electromagnetic wave transmitting device comprises:
a body comprising a transmitting end and a receiving end; and
a heating assembly disposed on at least one outer surface of the body, wherein the heating assembly comprises:
an electrically resistive element comprising an electrical connector electrically coupled to the power supply,
wherein the light source generates a light output that complies with at least one regulation in the airline industry,
wherein the heating assembly prevents condensation and precipitation from accumulating on the body of the electromagnetic wave transmitting device, and
wherein the heating assembly is positioned relative to the body of the electromagnetic wave transmitting device to allow the light output of the light source to be received by the receiving end of the body and transmitted out the transmitting end of the body.

20. The airport runway light fixture of claim 19, wherein the at least one wall of the frame is positioned below ground, and wherein the optical housing of the frame is substantially flush with a ground surface.

* * * * *